United States Patent [19]

Crabbe, Jr.

[11] Patent Number: 4,603,235

[45] Date of Patent: Jul. 29, 1986

[54] DYNAMIC EVENT SELECTION NETWORK

[75] Inventor: Edwin P. Crabbe, Jr., Peoria, Ariz.

[73] Assignee: GTE Communication Systems Corporation, Phoenix, Ariz.

[21] Appl. No.: 612,535

[22] Filed: May 21, 1984

[51] Int. Cl.⁴ ............................................. H04M 3/22
[52] U.S. Cl. ................................................ 179/18 ES
[58] Field of Search .............. 179/18 ES, 18 EB; 364/200 MS File, 900 MS File

[56] References Cited

U.S. PATENT DOCUMENTS

| | | | |
|---|---|---|---|
| 4,156,798 | 5/1979 | Doelz | 364/200 |
| 4,412,285 | 10/1983 | Neches | 364/200 |
| 4,456,954 | 6/1984 | Bulluont | 364/200 |
| 4,475,156 | 10/1984 | Federico | 364/200 |

*Primary Examiner*—Gareth D. Shaw
*Assistant Examiner*—John G. Mills
*Attorney, Agent, or Firm*—Frank J. Bogacz; Peter Xiarhos

[57] ABSTRACT

This invention describes a method for mapping one or more of a number of input events to one or more of a number of output functions. This method involves the use of a memory device to perform the mapping between the input events and the output functions. This invention performs the mapping function with a minimum of hardware devices.

18 Claims, 4 Drawing Figures

DYNAMIC EVENT SELECTION NETWORK

BACKGROUND OF THE INVENTION

The present invention pertains to processor systems and more particularly to the use of memory devices to dynamically map one or more of a number of input events to one or more of a number of output functions automatically.

In processor systems, it is required of the processor that it interact with external stimuli such as sensors, indicators, timers, etc. Each of these stimuli may initiate or may be initiated by the processor to perform some particular function. Some typical triggering events might include hardware matchers providing an output, counter or timer outputs or interrupt or other logic signals transmitted from or to the processor.

An assignment scheme is required to associate a particular triggering event with a desired functional output. This scheme is accomplished with an event routing scheme. Typically, event routing schemes are accomplished with dedicated connections or with multiplexers. Hard-wired connections allow no flexibility in altering the results for given input pattern. Such a configuration is very limiting for processor application. Implementing an event selection scheme with multiplexers requires full availability of input events at each multiplexer to select the particular output. This scheme needs many hard-wired connections. In addition, this scheme requires a dedicated multiplexer for each output function to be programmed. Having such a large amount of hardware to implement a selection scheme is costly and requires a considerable amount of physical space.

SUMMARY OF THE INVENTION

A dynamic event selection network is connected between a plurality of input sources, each of which provides triggering signals and a plurality of control devices, each which is operated in response to a control signal. A processor is connected to the selection network and initiates the operation of the network. A dynamic mapping arrangement is connected to the processor, to the input sources and to the control devices. The dynamic mapping arrangement operates in response to a set of changeable values of the triggering signals of the input sources to produce a particular set of changeable values of the control signals for transmission to the control devices.

The dynamic mapping arrangement is operated in response to a select signal of the processor to alter each of the many sets of values of control signals which it contains.

DESCRIPTION OF THE PREFERRED EMBODIMENT

Figure 1:
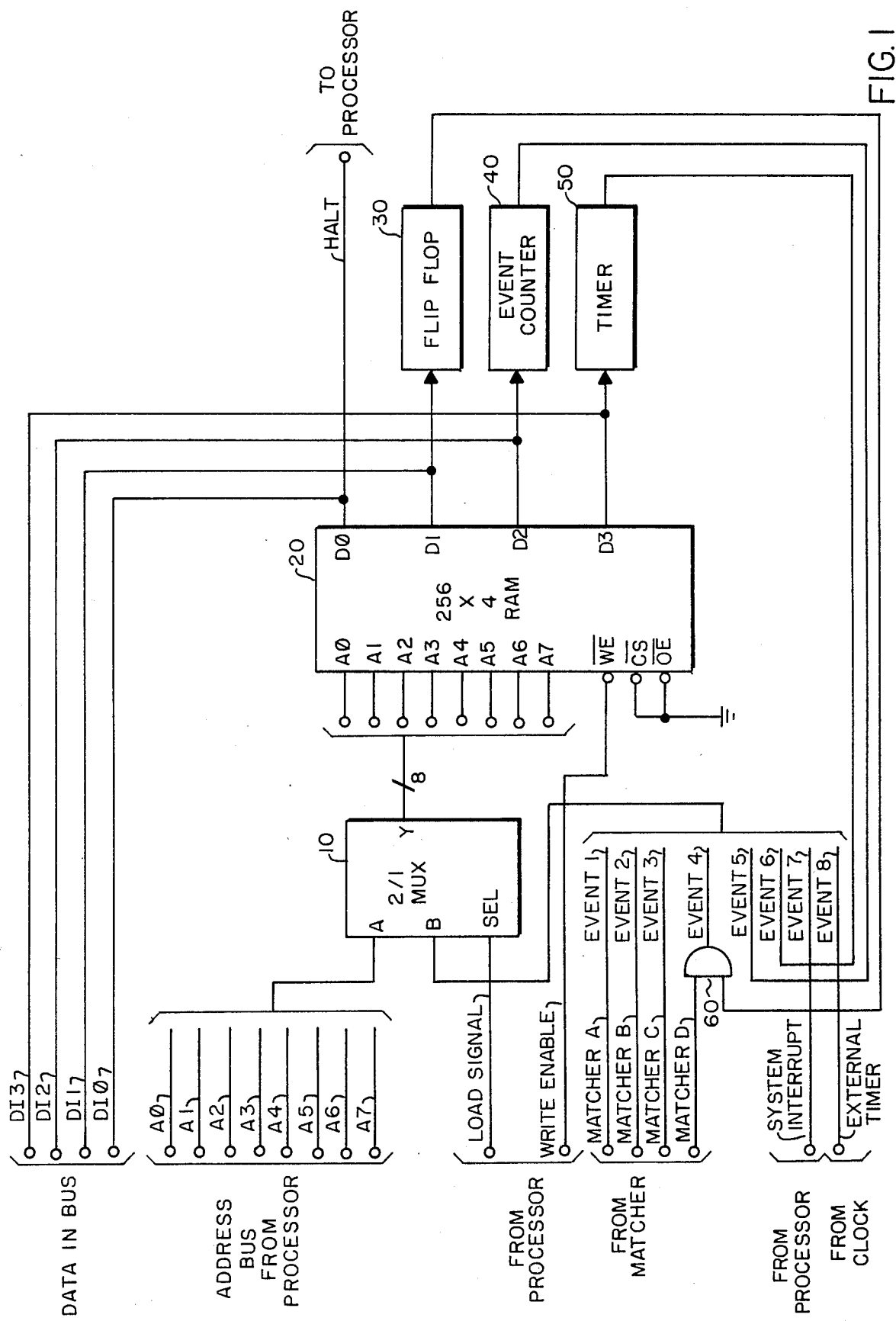
FIG. 1 is a schematic diagram of a dynamic event selection network embodying the principles of operation of the present invention.

Referring to FIG. 1, a trigger routing network which uses a static RAM device is shown. The trigger routing network employs a minimum amount of devices and provides complete flexibility to route any of a number of input events to one or more of any output functions. Furthermore, two or more input events may be logically combined to produce two or more output functions. This scheme provides for a complete mapping of any input event or events to any one or more output function.

Random access memory (RAM) device 20 is a 256×4-bit static RAM device. One such RAM device is capable of providing up to eight input events and mapping them to any or all of four output functions.

Each of the eight input events is termed a triggering event. These triggering events may be output signals from devices such as hardware matchers. These hardware matchers are devices which are manually or automatically settable to a predetermined value. This predetermined value is compared with a dynamically changing value presented on an address or a data bus for example. Further examples of these triggering events may be a system interrupt signal, generated by a processor. Processors may generate interrupt signals asynchronously to permit signaling between peripheral devices and the associated processor.

Another type of triggering event is one which is generated by a timer signal from a clock. The clock periodically transmits signals to the trigger routing network in order to enable a certain output function to occur after a particular number of signals have been counted.

Examples of output functions may include, but are not limited to: transmitting a signal to halt a central processing unit; arming a particular flip-flop device 30; incrementing an event counter 40; activating a timer 50 or any combination of the above functions.

A processor, which may take the form of a central processing unit, hard-wired logic or a process controller, is connected to 2:1 multiplexer 10. The processor is also connected to multiplexer 10 via a lead called the load signal to select the input to the multiplexer 10. The load signal provides for determining which of the two inputs is gated through multiplexer 10. The address bus connects the processor to multiplexer 10 and provides for accessing each of the 256×4-bit words of RAM memory 20. When the processor wishes to write or change the mapping of the triggering events to the output functions, it selects an address via the address bus and transmits the load signal to multiplexer 10. Multiplexer 10 gates the address bus through to the address inputs (A0 through A7) of RAM memory 20. The processor also signals on the write enable lead to ellect a write access to the RAM memory 20. RAM memory 20 is then written with a 4-bit data word at the appropriate address contained on the address bus via the DATA IN bus (DI0 through DI3) connected between the rrocessor and RAM memory 20.

Multiplexer 10 is connected to RAM memory 20 via an 8-bit bus connected to the address inputs (A0 through A7) of RAM memory 20. The second input to multiplexer 10 is another 8-bit bus comprising the triggering events such as address matchers, interrupt generators or timers, as mentioned above.

When the processor is not writing the RAM memory 20, the load signal will be such that the triggering event will be gated through multiplexer 10 via the 8-bit bus to the address inputs of RAM memory 20.

Since multiplexer 10 enables the leads representing the triggering events to be connected to RAM memory 20 via the address inputs A0 through A7, the occurrence of any triggering event will cause a particular 4-bit word in RAM memory 20 to be accessed. If the word accessed by the particular address has been preset by the processor with a logic 1 in a particular data bit position, the function associated with that data bit will be triggered or enabled.

As a result of a particular address being accessed, a 4-bit data word is read from memory and transmitted via the D0 through D3 output leads of RAM memory 20. The processor via the HALT lead, flip-flop 30, event counter 40 and timer 50 are respectively connected to the D0 through D3 output leads of RAM memory device 20. In response to the memory access of RAM device 20, an appropriate 4-bit data word will be read and transmitted via the D0 through D3 lead. Devices which are connected to these output leads will have their respective function enabled if the corresponding lead has a value of logic 1.

If, for example, a logic 1 is present on the D0 output lead, a signal will be transmitted via the HALT lead to the processor. This HALT signal will instruct the processor to stop its current operation. If the D1 lead presented at logic 1 value, flip-flop 30 will be set. Flip-flop 30 is connected to AND gate 60 and matcher A is also connected to AND gate 60. AND gate 60 is connected via the EVENT 4 lead as an input to multiplexer 10. Therefore, as a result, the output function of the D1 lead via flip-flop 30 causes another triggering event to access RAM memory 20 as input event 4. When the matcher A signal is true and flip-flop 30 is set, the EVENT 4 signal will be generated and transmitted to RAM memory device 20 to generate one or more other output functions in the same manner as indicated above. Hardware matchers B, C and D are respectively connected to multiplexer 10 via the EVENT 3, EVENT 2 and EVENT 1 leads.

Event counter 40 is connected as a triggering event via the EVENT 5 lead to multiplexer 10. As a result, the activation of event counter 40 by RAM memory 20 can trigger the access of another RAM memory word, which may result in another combination of output functions being enabled. Similarly, timer 50 is connected to multiplexer 10 as a triggering event via the EVENT 6 lead. Other triggering events such as a system interrupt or an external timer are connected via EVENT leads 7 and 8 respectively to multiplexer 10 and operate to select particular data words of RAM memory 20.

Figure 2:
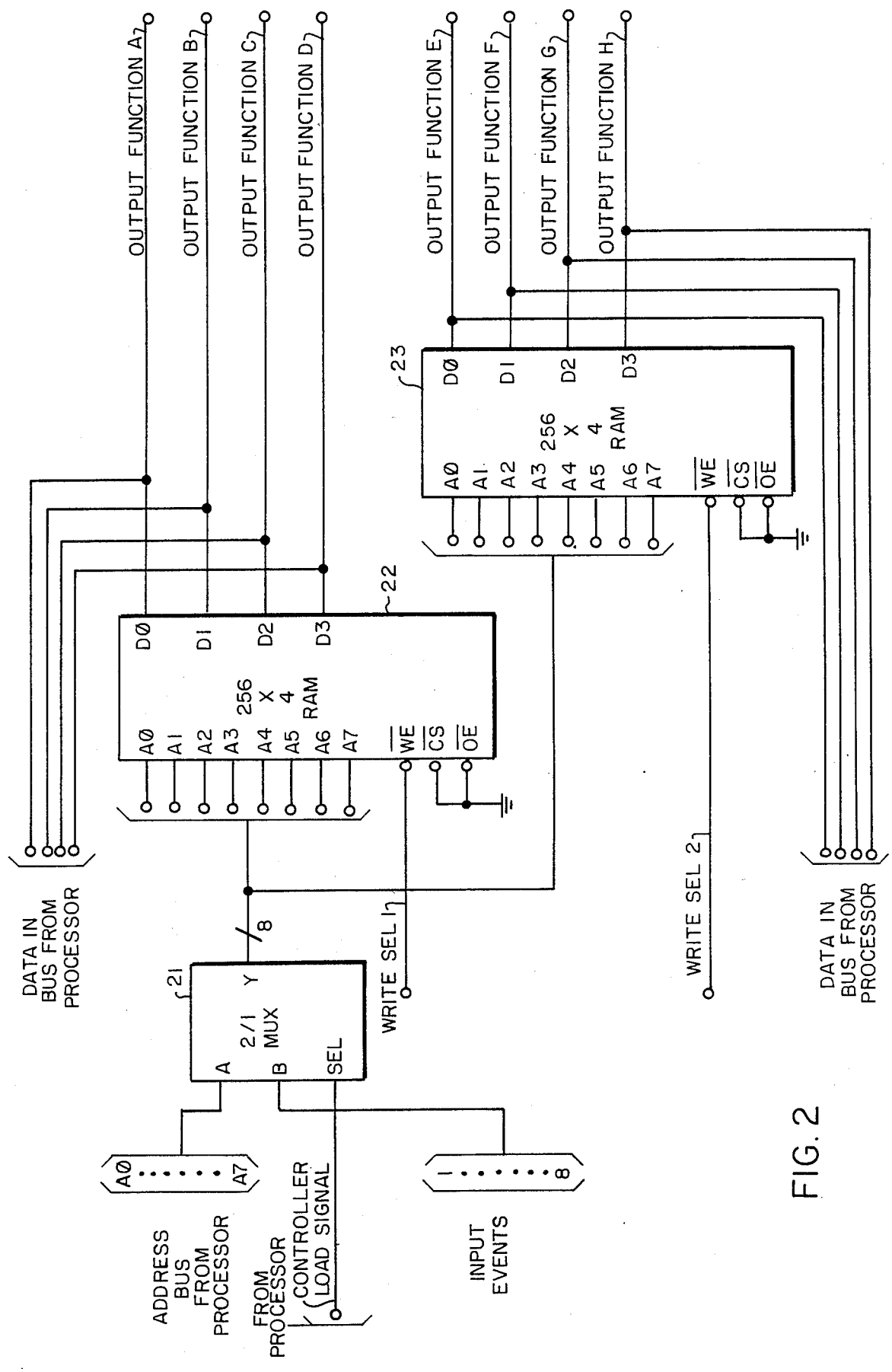
FIG. 2 is a schematic diagram of an extended dynamic event selection network.

For configuration in which more than four input events or output functions are desired, a plurality As shown in FIG. 2, as many as eight input events and the address bus from the processor containing eight address leads are connected to 2:1 multiplexer 21. When the controller load signal indicates that one of the RAM memories 22 or 23 is to be written, address bus A0 through A7 is gated through multiplexer 21 and either RAM 22 or 23 is written. The writing of RAMS 22 and 23 is controlled by the WRITE SEL 1 or WRITE SEL 2 signals from the processor. That is, the particular WRITE SEL signal which is enabled will determine which particular RAM 22 or 23 is written with the data word to be output via the D0 through D3 leads when that particular address is later selected.

When the controller load signal is in the opposite logic value, the input events are enabled through multiplexer 21. One or both of the RAMS 22 and 23 may be enabled by the WRITE SEL signal 1 or 2 respectively. The RAM which is enabled will have the contents at the address selected by the input events 1 through 8 read out and displayed on the D0 through D3 leads. Therefore, for controlling as many as eight output functions, such as output functions A through H shown in FIG. 2, both RAM memories 22 and 23 will be enabled simultaneously and a complete 8-bit data word will be displayed across output function leads A through H.

These output functions may be employed similar to that discussed in supra. to control as many as eight events or to be connected back to the selection network as other input events to trigger the further reading of other data words within RAMS 22 and 23. In such an arrangement, a total of eight input events and eight output functions may be implemented.

Figure 3:
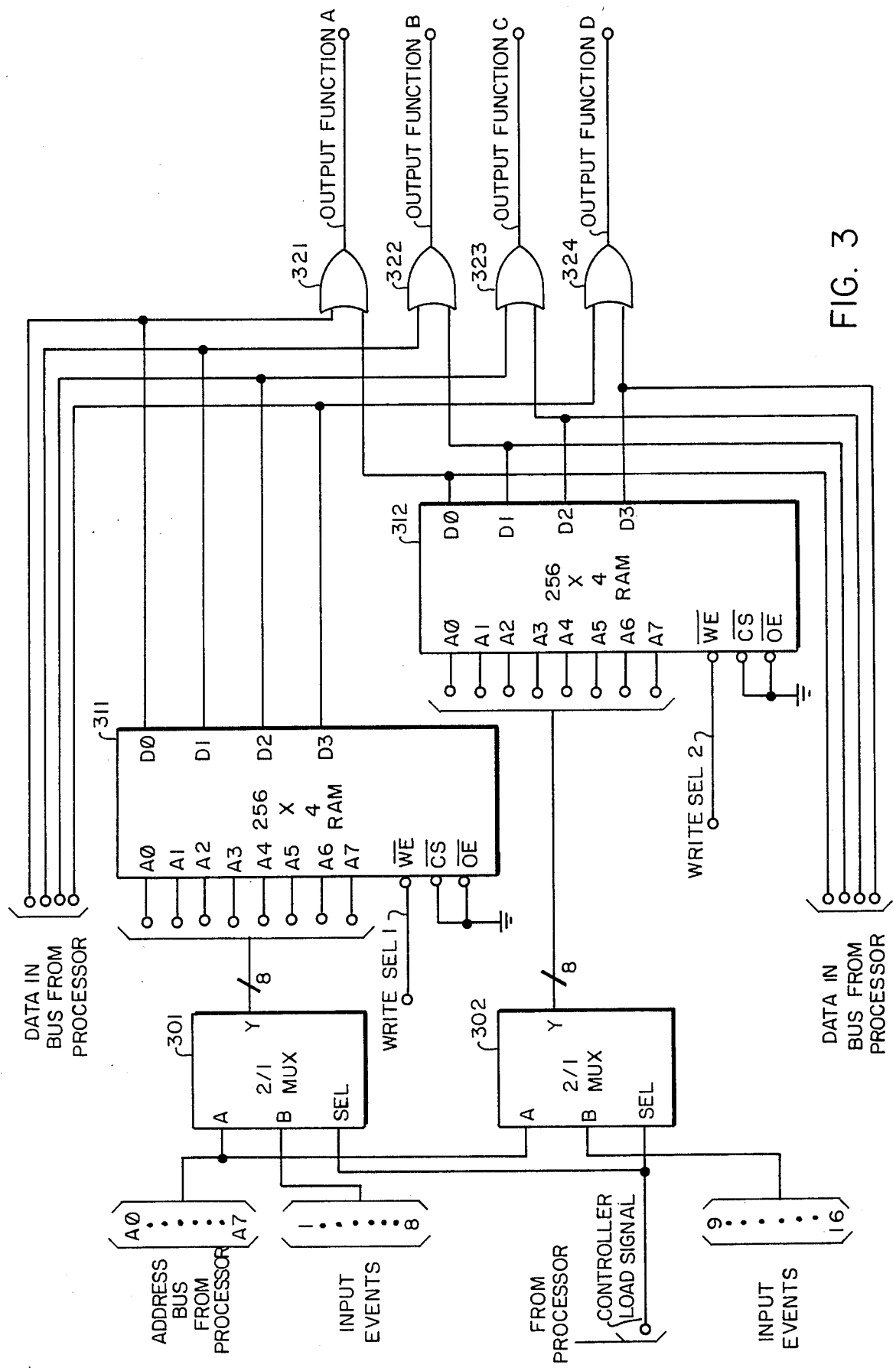
FIG. 3 is a schematic diagram of an extended dynamic event selection network.

For mapping up to sixteen input events to four output functions, we now turn to FIG. 3. When the controller load signal is at a first logic value, multiplexers 301 and 302 enable writing RAM memories 311 and 312 respectively, via the DATA IN bus as discussed supra. When the controller load signal is in the opposite logic state, multiplexers 301 and 302 enable input events 1 through 8 and 9 through 16, respectively, to be gated through multiplexers 301 and 302 to RAM memories 311 and 312. The 4-bit data words from each of RAM memory 311 and 312 as addressed by the address presented on the input event leads 1 through 16, are read out and transmitted via the D0 through D3 leads of RAM memories 311 and 312. The D0 through D3 leads of each RAM memory 311 and 312 are respectively connected to OR gates 321 through 324. The output of each OR gate 321 through 324 provides one output function A through D, respectively. That is, if the contents of the address read from RAM memory 311 or RAM memory 312 has a 1 in the corresponding bit position, the related output function will be enabled. For example, if the D0 lead of RAM memory 311 is at logic 1 and the D0 lead of RAM memory 312 is at logic 0, output function A will be enabled. Similarly, if the logic values of the D0 output leads are reversed from the previous logic values, output function A will be enabled. If however, D0 leads of both RAM memories 311 and 312 are at logic 0, output function A will not be enabled.

Figure 4:
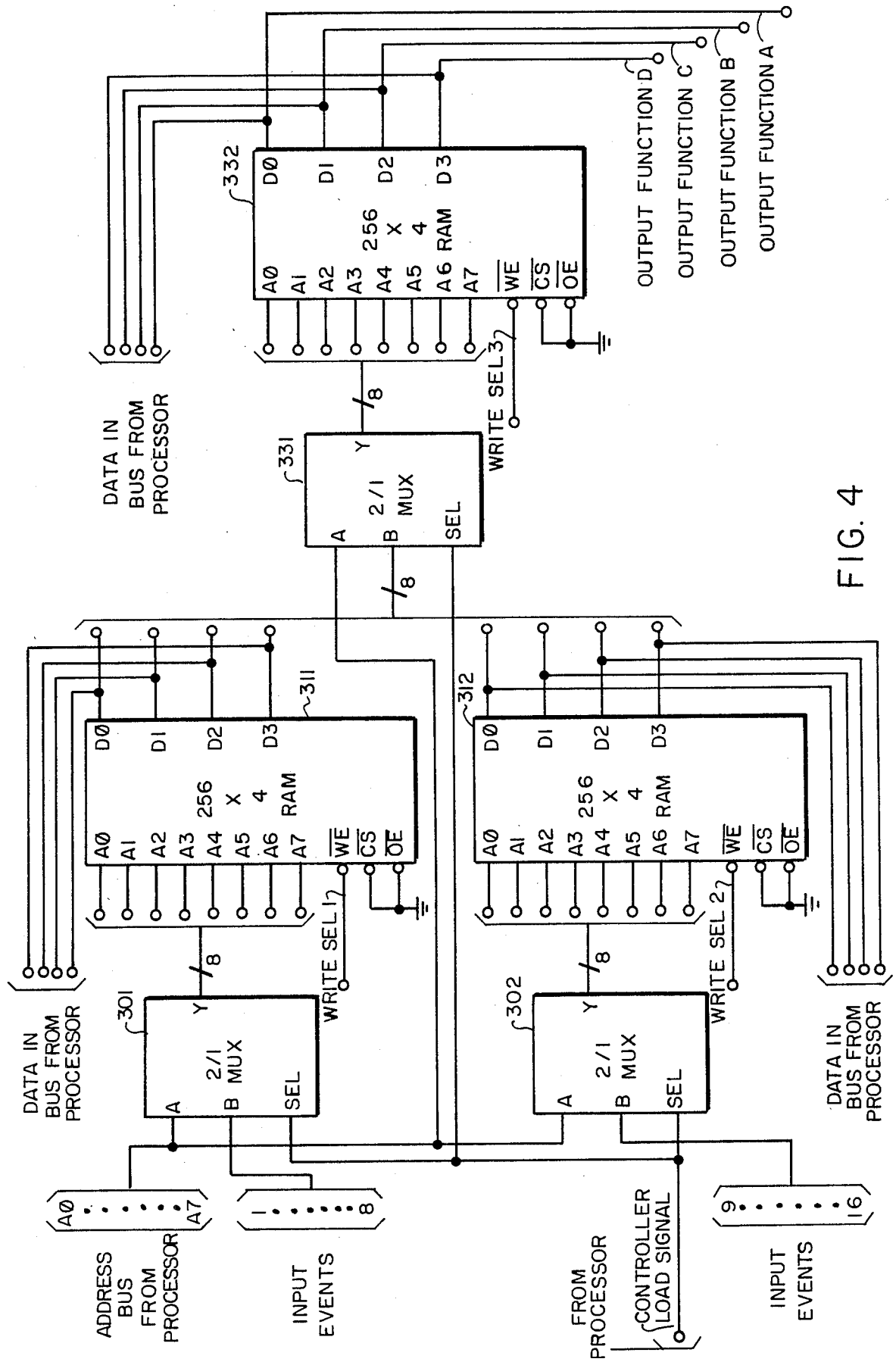
FIG. 4 is a schematic diagram of a multilevel dynamic event selection network.

Referring to FIG. 4, the same figure is shown as in FIG. 3 except that OR gates 321 through 324 have been replaced by multiplexer 331 and RAM memory 332. The operation of this circuit is similar to that as described in FIG. 3, except for the multiplexer 331 and RAM 332 replacing OR gates 321–324. RAM memory 332 is connected to multiplexer 331 and to the processor via the WRITE SEL 3 lead. Multiplexer 331 is connected to the address bus of the processor A0 through A7 and the controller load signal of the processor via the controller load signal lead. Multiplexer 331 is connected via the D0 through D3 outputs to RAM memories 311 and 312. In order for the processor to write RAM memory 332, the WRITE SEL 3 lead will be set and the controller load signal will indicate that multiplexer 331 is to enable the address A0 through A7 from the processor to be transmitted to RAM memory 332. In addition, the data to be written at that address will be transmitted to RAM memory 332 via the DATA IN bus. As a result, that particular address within RAM memory 332 will contain the identity of which output functions A through D are to be enabled for a particular address selection of the A0 through A7 leads of RAM memory 332.

When the controller load signal lead indicates that multiplexer 331 is to select as inputs to RAM 332 the result of input events 1 through 16, the D0 through D3 leads of RAM memories 311 and 312 now comprise an 8-bit bus which is gated through multiplexer 331 to the A0 through A7 address inputs of RAM memory 332. The functional operation of RAM 332 will be similar to that for the RAM devices discussed supra. Therefore, the 8-bit pattern which is represented by the data output leads D0 through D3 of RAM memory 311 and the D0 through D3 output leads of RAM memory 312 will be used subsequently as an address to RAM memory 332 in order to select one or more of output functions A through D. The advantage of this over the FIG. 3 configuration is that full availability of the four output functions A through D is obtained from any or all of the input events 1 through 16. In the FIG. 3 configuration, the outputs of RAM memories 311 and 312 are necessarily ORed in order to provide the four outputs. In FIG. 4, any combination of the D0 through D3 leads of RAM memories 311 and 312 may provide the output functions A through D. This greatly enhances the flexibility of this dynamic event selection network.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A digital dynamic event selection network for telephone and real time processor control systems comprising:
   a plurality of sources of input events each connected to said selection network providing a triggering signal;
   a plurality of control devices each control device being connected to said selection network and operated in response to a control signal;
   processor means connected to said selection network via an address bus, a data bus and a control bus;
   multiplexing means connected to said plurality of source of input events and to said processor means, said multiplexing means being operated in response to a load signal of a first binary value of said control bus to transmit said address bus signals to said selection network or said multiplexing means being operated in response to said load signal of a second binary value to transmit said plurality of triggering signals provided by sources of input events to said selection network
   memory means connected to said multiplexing means and to said processor means, said memory means being operated in response to said load signal of said first value and to a write signal of said control bus of said processor means to store a set of changeable values corresponding to said plurality of control devices for enabling or disabling said devices;
   said memory means being further connected to said control devices, said memory means operated in response to said load signal of second value and to said plurality of triggering signals to transmit one said stored set of changeable values to said control devices for enabling or disabling said device; and
   said plurality of control devices being operated in response to said transmitted set of changeable values, said set of changeable values being a set said control signals.

2. A dynamic event selection network as claimed in claim 1, wherein said multiplexing means includes an 8-bit wide, 2:1 ratio multiplexer arrangement.

3. A dynamic event selection network as claimed in claim 1, wherein said memory means includes random access memory means of size $2^N \times M$ bits whereby as many as N sources of input events operate as many as M control devices.

4. A dynamic event selection network as claimed in claim 1, wherein said multiplexing means includes first multiplexer means connected to said processor means and to said plurality of sources of input events.

5. A dynamic event selection network as claimed in claim 4, wherein said memory means includes:
   first random access memory means connected to said processor means and to said first multiplexer means; and
   second random access memory means connected to said processor means and to said first multiplexer means.

6. A dynamic event selection network as claimed in claim 5, wherein said first and second random access memory means are each of size $2^N \times M$ bits and are each connected to a different plurality of M control devices, said first and second random access memory means being operated in response to as many as N sources of input events to control as many as 2M control devices.

7. A dynamic event selection network as claimed in claim 1, wherein said multiplexing means includes:
   first multiplexer means connected to said processor means and to a first plurality of said sources of input events; and
   second multiplexer means connected to said processor means and to a second plurality of said sources of input events.

8. A dynamic event selection network as claimed in claim 7, wherein said memory means includes:
   first random access memory means connected to said processor means and to said first multiplexer means; and
   second random access memory means connected to said processor means and to said second multiplexer means.

9. A dynamic event selection network as claimed in claim 8, wherein there is further included gating means connected between said first and second random access memory means and said plurality of control devices.

10. A dynamic event selection network as claimed in claim 9, wherein said first and second random access memory means are each of size $2^N \times M$ bits whereby M control devices are operated via said gating means by as many as 2N sources of input events.

11. A dynamic event selection network as claimed in claim 10, wherein said gating means includes a plurality of OR gating means.

12. A dynamic event selection network as claimed in claim 8, wherein there is further included third multiplexer means connected to said first and second random access memory means and to said processor means via said data, address and control buses, said third multiplexer means being operated in response to said control bus of said processor means to transmit said stored set of changeable values as a set of control signals of said first and second random access memory means or said third multiplexer means being operated to transmit an address received from said processor means.

13. A dynamic event selection network as claimed in claim 12, wherein there is further included third random access memory means connected to said third multiplexer means and to said processor means via said control bus, said third random access memory means being operated in response to said transmitted sets of changeable values of said first and second random access memory means to produce a second set of changeable values for transmission to said control devices as a set of said control signals.

14. A dynamic event selection network as claimed in claim 13, wherein said third random access memory means is connected to said plurality of control devices and said third random access memory means is of size $2^N \times M$ bits and is operated whereby M control devices are operated by as many as $2 \times N$ sources of input events.

15. A dynamic event selection network as claimed in claim 5, wherein said first and second random access memory means each includes a 256 by 4-bit word random access memory device.

16. A dynamic event selection network as claimed in claim 8, wherein said first and second random access memory means each include a 256 by 4-bit word random access memory device.

17. A dynamic event selection network as claimed in claim 14, wherein said third random access memory means includes a 256 by 4-bit word random access memory device.

18. A dynamic event selection network as claimed in claim 12, wherein said third multiplexer means includes an 8-bit wide, 2:1 ratio multiplexer arrangement.

* * * * *